Aug. 3, 1948.　　　J. R. TAYLOR　　　2,446,442
ABSORPTION OF AMMONIA IN SODA ASH PRODUCTION
Filed June 17, 1944

Inventor:
J. R. Taylor,
By Alex. E. MacRae
Attorney.

Patented Aug. 3, 1948

2,446,442

UNITED STATES PATENT OFFICE 2,446,442

ABSORPTION OF AMMONIA IN SODA ASH PRODUCTION

John Ross Taylor, Westmount, Quebec, Canada

Application June 17, 1944, Serial No. 540,786
In Canada June 24, 1943

5 Claims. (Cl. 23—65)

This invention relates to the production of soda ash and more particularly to that portion of the method and apparatus in which ammonia is absorbed in the circulating brine liquor, which constitutes one stage in the manufacture of soda ash. This invention bears relation to those described in applicant's copending applications, Serial Nos. 540,784 and 540,785, now abandoned, filed June 17, 1944.

The ammoniation of brine is simple chemically but mechanically it is surrounded with difficulties. In usual practice it is carried out in tall sectional usually cast iron towers with numerous division or bubble plates through which ammonia, entering at the bottom of the tower, passes in contact with brine which is admitted at the top of the tower. In addition to ammonia and water vapour the gases contain carbon dioxide, and considerable sedimentation and scale formation takes place in the absorber. This causes difficulty and requires the maintenance of spare equipment or a shut-down of the absorber for cleaning purposes. Settling tanks, usually consisting of three or more per unit, are required for removing sediment from the liquor and the clear liquor passes to the carbonation towers for precipitating sodium bicarbonate.

The object of the present invention is to provide a method and apparatus for absorbing ammonia in brine liquor which is much more economical in installation and maintenance costs, which reduces scale formation in the absorber, which reduces operation difficulties, and which permits more continuity and efficiency of operation.

Figure 1:
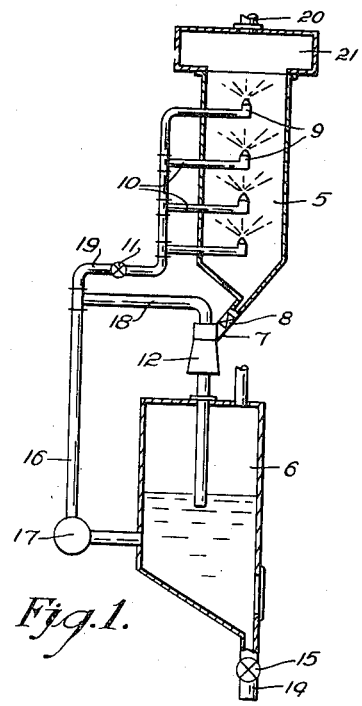
Figure 2:
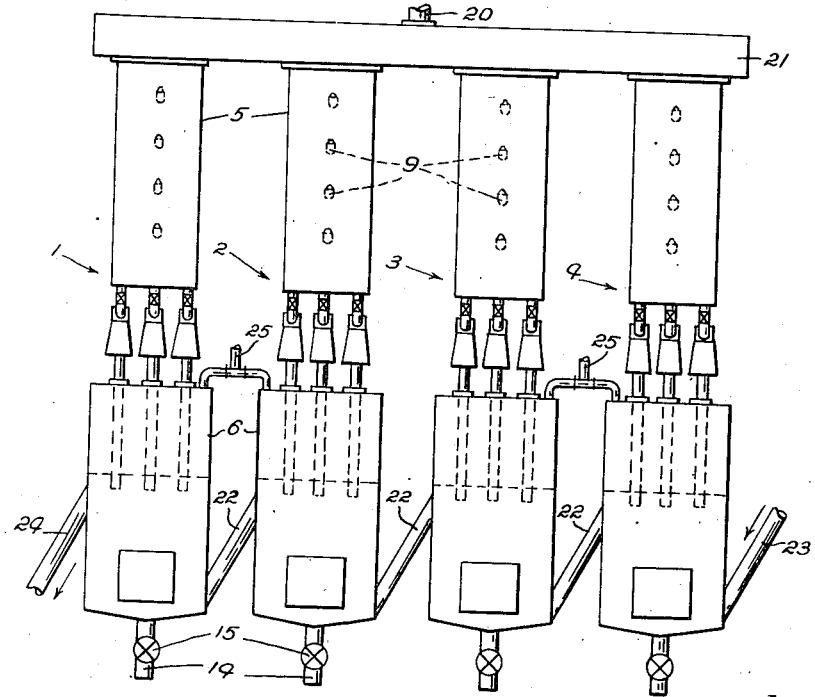

Other objects and advantages of the invention will appear from the following description taken in conjunction with the accompanying drawings in which Figure 1 is an end view in vertical section of the absorber and Figure 2 is a side view in vertical elevation.

As shown in the drawing the absorber comprises a plurality of units 1, 2, 3, 4 connected in series for circulation of brine for contact with and absorption of ammonia. Each unit has a spray chamber 5 and a circulation chamber 6. The spray chamber has an inclined bottom with discharge outlets 7, each of which may be controlled by a valve 8, and a plurality of sprays 9 each supplied by a pipe 10. Each outlet 7 leads to an ejector or aspirator 12, one or more of which discharges into each circulation chamber 6 having an inclined bottom and a discharge outlet 14 with a control valve 15. A conduit 16 with a pump 17 has a branch 18 leading to the aspirators and a branch 19 controlled by a valve 11 leading to the spray pipes 10, as most clearly shown in Figure 1.

A conduit 20 supplies ammonia containing gases to the several spray chambers 5, preferably through a common header 21.

The circulation chambers 6 are connected in series by conduits 22, each of which leads from a point removed from the outlet 14 but below the liquor level in the chamber and discharges into the succeeding chamber at a point adjacent its bottom. A conduit 23 supplies brine liquor to the initial circulating chamber of the series and a conduit 24 carries the ammoniated brine from the last chamber in the series to a carbonation unit as the next stage in the production of soda ash as disclosed in copending application No. 540,785. The top of each circulation chamber is vented through pipe 25 which preferably leads back to a scrubber as in normal practice.

In operation ammonia containing gas from the usual reflux tower is led into each spray chamber 5, preferably through the header 21, and purified brine liquor is fed into the initial circulating chamber 6 through conduit 23. The pump 17 circulates the brine through the sprays 9 and ejectors 12. The liquor from the sprays absorbs the ammonia and carbon dioxide and the mixed liquor and gas are drawn through the ejectors or aspirators where further absorption takes place. The ejectors discharge into the circulation chambers at a point below the liquor level therein and any unabsorbed gases escape through the outlets 25 and are returned to the system through the scrubbers. The repeated circulation of the liquor through the successive chambers and aspiration with the gases insures efficient and uniform absorption. The ejectors create a partial vacuum in the spray chambers and thus draw the gases from the distiller of the system into the absorber unit. Reduced pressure thus prevails in the distiller.

It will be observed that the header and spray chambers are under reduced pressure created by the ejectors, whereas the liquor is discharged from the circulation towers under slight pressure, rather than reduced pressure, because of the back pressure from the scrubber to which the outlet 25 is connected. This avoids release of absorbed ammonia which occurs in standard practice where vacuum pumps are used for circulating the gas. It also avoids loss of ammonia incidental to circulation by pumps.

The same volume and depth of liquor is maintained in each circulation chamber, regardless of the rate of flow of the liquor through the system and the rate of flow may be readily adjusted to insure the desired absorption of ammonia. The number of absorption units in the system may be varied to suit particular production requirements. One or more units may be cut out of operation without closing the whole system, by merely adjusting the rate of flow.

The brine used in the absorber having been treated to remove scale forming salts the absorber is not used as a purifier as in standard practice. Any sludge formed settles in the restricted bottom of the circulation chambers and may be drawn off through the outlets 14.

The absorber unit thus affords practically automatic operation, with relatively little control and supervision. The apparatus is of inexpensive construction in comparison with that now used. The system thus affords great economy and may be set up readily in relatively small units for convenient location.

A cooling system of any desired type would be installed in the absorber unit to take care of the heat of absorption of ammonia in brine, and also to cool the liquor to as low a temperature as desired in order to secure maximum efficiency of absorption and a low temperature in the discharged liquor.

A cooler may also be provided between the absorber unit and the precipitation unit to ensure the maintenance of constant temperature in the liquor feed to the precipitation unit.

It will be apparent that many changes may be made without departing from the spirit and scope of the invention as defined in the following claims.

I claim:

1. A method of absorbing ammonia in brine liquor which comprises forming a body of brine liquor, continuously adding a fresh supply of liquor to said body, continuously withdrawing a portion of said body and dividing the withdrawn portion into two streams, forming a substantially confined body of ammonia-containing gas above the body of liquor and continuously supplying fresh ammonia-containing gas to the confined body, delivering one of said streams of liquor in the form of a spray into the confined body of ammonia-containing gas thus providing a body of mixed gas and liquor above the body of liquor, delivering under pressure the other of said streams of liquor from a point above the body of liquor into the body of liquor at a point below the level thereof, placing the body of mixed gas and liquor in contact with the pressure flowing second stream of liquor at a point above the body of liquor, entraining a stream of mixed gas and liquor from the body thereof as a result of said contact therewith of the pressure flowing second stream of liquor for concurrent flow with the second stream, and continuously withdrawing ammoniated brine from the body of brine liquor.

2. Apparatus for the absorption of ammonia in brine liquor comprising two containers arranged one above the other, the upper container having an inlet for gases, the lower container having an inlet for liquid, a conduit providing communication between the containers and having an upwardly directed spray nozzle located within the upper container, walls forming a downwardly directed passage leading from one container to the other, an ejector interposed in said passage, a branch leading from said conduit to the ejector, and a pump in said conduit for pumping liquid from the lower container to the spray nozzle and the ejector.

3. Apparatus for the absorption of ammonia in brine liquor comprising two containers arranged one above the other, the upper container having an inlet for gases, the lower container having a liquid inlet adjacent the bottom thereof and a liquid outlet at a level above said liquid inlet, a conduit providing communication between the containers and having a plurality of branches leading into the upper container each branch having an upwardly directed spray nozzle located within the upper container, said nozzles being arranged one above the other, means providing a plurality of downwardly directed passages leading from the bottom of the upper container into the lower container, an ejector interposed in each passage, said conduit having a branch leading to the ejectors, and a pump in the conduit for pumping liquid from the lower container to the spray nozzles and ejectors.

4. Apparatus for the absorption of ammonia in brine liquor comprising two containers arranged one above the other and each having an inclined bottom wall, the upper container having a gas inlet, the lower container having a liquid inlet adjacent the bottom thereof and a liquid outlet at a level above the liquid inlet, a conduit providing communication between the containers and having an upwardly directed spray nozzle located within the upper container, means providing a downwardly directed passage leading from the inclined bottom wall of the upper container to a point within the lower container substantially at the level of said liquid outlet, an ejector interposed in the passage, said conduit having a branch leading to the ejector, and a pump in said conduit for pumping liquid from the lower container to the spray nozzle and the ejector.

5. Apparatus for the absorption of ammonia in brine liquor comprising a plurality of pairs of containers, the containers of each pair being arranged one above the other, a header arranged above the upper series of containers and having communication with each of the upper containers, said header having a gas inlet, each of the lower containers having a liquid inlet adjacent the bottom thereof and a liquid outlet at a level spaced above the liquid inlet, an inclined conduit connecting the outlet of each of the lower containers with the exception of the last one with the inlet of the adjacent lower container, a pipe providing communication between the upper and lower of each pair of containers and having an upwardly directed spray nozzle located within the respective upper container, walls providing a downwardly directed communicating passage between each pair of containers, an ejector interposed in each said passage, each of said pipes having a branch leading to a respective ejector, and a pump in each of said pipes for pumping liquid from the respective lower container to the spray nozzle and ejector with which the pipe communicates.

JOHN ROSS TAYLOR.

(References on following page)

REFERENCES CITED

The following references are of record in the file of this patent:

UNITED STATES PATENTS

| Number | Name | Date |
|---|---|---|
| Re. 13,684 | Heslewood | Feb. 10, 1914 |
| 263,981 | Solvay | Sept. 5, 1882 |
| 363,952 | Frasch | May 31, 1887 |
| 1,056,044 | Muchka | Mar. 18, 1913 |
| 1,808,956 | Ketterer | June 9, 1931 |
| 2,020,850 | Myhren et al. | Nov. 12, 1935 |
| 2,031,554 | Torchet | Feb. 18, 1936 |
| 2,047,628 | Haglund | July 14, 1936 |
| 2,090,994 | Brandes | Aug. 24, 1937 |
| 2,102,042 | Spence | Dec. 14, 1937 |
| 2,182,533 | Bowman | Dec. 5, 1939 |

FOREIGN PATENTS

| Number | Country | Date |
|---|---|---|
| 12,809 | Great Britain | 1908 |